United States Patent
Itoh

(10) Patent No.: US 6,320,672 B1
(45) Date of Patent: *Nov. 20, 2001

(54) IMAGE REPRODUCING APPARATUS AND AN IMAGE REPRODUCING SYSTEM USING THE SAME

(75) Inventor: Shinji Itoh, Kanagawa (JP)

(73) Assignee: Fuji Photo Film Co., Ltd., Minami-ashigara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,145

(22) Filed: Jan. 21, 1998

(30) Foreign Application Priority Data

Jan. 21, 1997 (JP) ...................................... 9-008558

(51) Int. Cl.$^7$ ...................................... G06K 15/00
(52) U.S. Cl. ........................... 358/1.9; 358/1.14; 358/468
(58) Field of Search ................... 358/487, 474, 358/468, 401, 527, 400, 444, 1.9; 396/319, 429; 355/27; 395/114, 115

(56) References Cited

U.S. PATENT DOCUMENTS 5,041,915 * 8/1991 Hirota ................................. 358/400
5,799,219 * 8/1998 Moghadam ......................... 358/487

* cited by examiner

Primary Examiner—Jerome Grant
(74) Attorney, Agent, or Firm—Birch, Stewart, Kolasch & Birch, LLP

(57) ABSTRACT

A user can perform the desired image processing on image data for a given original image so as to produce finished prints to his or her preference means image processing is performed on said input image data to produce output image data. An image recording unit scans and exposes a photosensitive material in accordance with an output image data and outputs prints having development and other necessary processing performed on the exposed photosensitive material. A control unit controls the operations of reading means, the image processing unit and the image recording unit and connects said image reproducing apparatus to networks.

16 Claims, 5 Drawing Sheets

IMAGE REPRODUCING APPARATUS AND AN IMAGE REPRODUCING SYSTEM USING THE SAME

BACKGROUND OF THE INVENTION

The present invention relates to an image reproducing apparatus that reads the image recorded on originals such as films and reflection originals, performs specified image processing on the resulting data and outputs prints (photographs) having the image processed video data reproduced thereon. The invention also relates to an image reproducing system using said image reproducing apparatus.

Conventionally, the images recorded on photographic films (which are hereunder referred to as "films") and the like, have been printed on photosensitive materials by a technique called "direct exposure" in which light carrying the information of the image on the film is projected onto the photosensitive material to effect areal exposure. Today, this technique is increasingly replaced by digital exposure in which the image information recorded on a film is read photoelectrically, converted to digital image data which in turn is subjected to various kinds of digital image processing and subsequent image recording. Image reproducing devices such as digital photoprinters utilizing this "digital exposure" technique are already in commercial use.

The digital photoprinter is essentially composed of a scanner (image reading device), a controller and a printer (image recording device). In the scanner utilized in the digital photoprinter, reading light issuing from a light source is incident on a film and the projected light carrying the image recorded on the film passes through an imaging lens to be focused on an image sensor such as a CCD sensor, which performs photoelectric conversion to read the image on the film. The resulting data is subjected to various kinds of image processing as required and the processed image information is transferred to the controller as input image data which corresponds to the image recorded on the film.

In the controller, the conditions for various kinds of image processing are typically set in accordance with the input image data transferred from the scanner and, thereafter, the desired digital image processing is performed on the image data, and after other conditions such as exposure conditions have been determined, output image data having a pixel number determined by the density of recording pixels and the print size is transferred to the printer. Image processing is not the only function of the controller and it performs other jobs such as the overall control and management of the digital photoprinter.

In the printer, if it is in an apparatus of a type that utilizes exposure by scanning with light beams, the latter are modulated in accordance with the image data supplied from the controller and the thus modulated light beams are deflected in the main scanning direction as the photosensitive material is transported in an auxiliary scanning direction which is perpendicular to the main scanning direction, whereby the photosensitive material is exposed to form a latent image, which is then subjected to development and other processing in accordance with the type of the photosensitive material, thereby producing finished prints which reproduce the image recorded on the film.

In the digital photoprinter, the film is read photoelectrically and the exposure conditions are determined on the basis of color/density correction performed by data processing. Therefore, only a short time is taken in the exposure of a single image. In addition, the exposure time is constant if the image size is the same and, hence, it is possible to perform more rapid printing than in the conventional areal exposure. As a further advantage, editing such as image synthesis and division and image processing such as color/density adjustments can be freely performed to output finished prints which have been subjected to flexible editing and image processing in accordance with a specific application.

What is more, the image information in the finished prints can be stored on a recording media such as a magnetooptical disk and, hence, in a case where extra printing is desired, there is no need to read the film again nor is it necessary to re-determine the exposure conditions and this provides rapidity and ease in the operation of extra printing. It should also be mentioned that in terms of resolution, color/density reproducibility and other points, prints that feature almost complete reproduction of the image information recorded on films and the like can be output in the digital photoprinter, although this has been difficult to accomplish by prints produced by the conventional direct exposure.

A problem with image reproducing apparatus such as the digital photoprinter described above is that the image data for a given original image is subjected to specified image processing almost automatically, so it is difficult to perform the image processing desired by an individual user. In other words, the user does not directly perform the desired image processing on the image data for a given original image and, hence, the output print is not necessarily finished to the preference of a specific user.

SUMMARY OF THE INVENTION

The present invention has been accomplished under these circumstances and has as an object providing an image reproducing apparatus with which the user can perform the desired image processing on image data for a given original image so as to produce finished prints to his or her preference.

Another object of the invention is to provide an image reproducing system using the apparatus.

The first object of the invention can be attained by an image reproducing apparatus comprising image reading means by which the image recorded on an original is read photoelectrically and output as input image data, image processing means which performs specified image processing on said input image data to produce output image data, image recording means which scans and exposes a photosensitive material in accordance with said output image data and which outputs prints having development and other necessary processing performed on the exposed photosensitive material, and control means for controlling the operations of said image reading means, said image processing means and said image recording means, said control means also having means for connecting said image reproducing apparatus to networks.

The second object of the invention can be attained by an image reproducing system comprising the image reproducing apparatus as set forth above which has means for connection to networks, a user terminal for performing the desired image processing on the image data read by said image reproducing apparatus and a video server for holding said read image data and image data as obtained by said image processing, said image reproducing apparatus, said user terminal and said video server being interconnected via networks, wherein the image recorded on an original is read by means of said image reproducing apparatus, the read image data is stored in said video server via a network, the image data stored in said video server is downloaded to the user terminal via a network and subjected to the desired image processing, the thus processed image data as well as order information ordering prints having the processed image data reproduced thereon are uploaded to said video server via a network, the processed image data meeting said order information is transferred to said image reproducing apparatus via a network by means of said video server and the prints having said processed image data reproduced thereon are output by means of said image reproducing apparatus.

DETAILED DESCRIPTION OF THE INVENTION

The image reproducing apparatus of the invention and an image reproducing system using the same will now be described in detail with reference to the preferred embodiment shown in the accompanying drawings.

Figure 1:
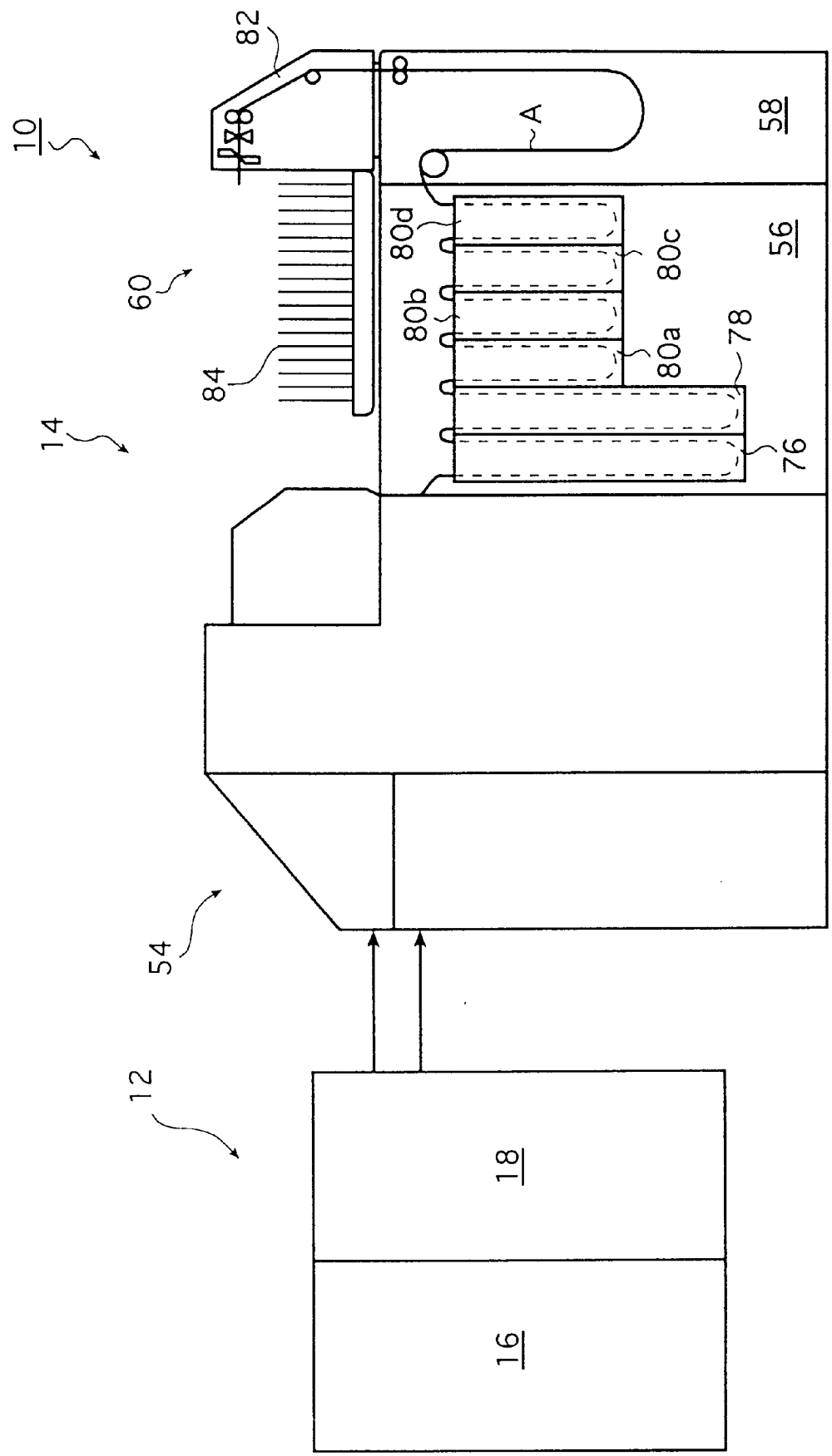
FIG. 1 is a diagram showing the concept of a digital photoprinter as an embodiment of the image reproducing apparatus of the invention.

FIG. 1 is a diagram showing the concept of a digital photoprinter as an embodiment of the image reproducing apparatus of the invention. The digital photoprinter indicated by 10 in FIG. 1 (which is hereunder referred to as "photoprinter 10") performs photoelectric reading of the image recorded on an original, converts it to digital data, performs image processing on the digital data and outputs prints (photographs) having the original image reproduced thereon. In the illustrated case, the photoprinter 10 has an input machine 12 and a printer (output machine) 14.

The original to be handled with the photoprinter 10 may be a transmission original as exemplified by various types of photographic films (hereunder referred to as "films") or a reflection original as exemplified by various types of color prints (color photographs) and printed matter. If desired, digital image data as produced by digital cameras may be directly used as the original image.

The following description assumes the use of a film as the original.

The input machine 12 is an integral assembly of a scanner (reading device) 16 which performs photoelectrical reading of a recorded image and a controller 18 which performs specified image processing on the image data read from the film with the scanner 16 and which also performs overall control and management of the photoprinter 10. The printer 14 is a recording apparatus which scans and exposes a photosensitive material with light beams modulated in accordance with the image data processed with the controller 18 and outputs prints after performing development and other processing.

Figure 2:
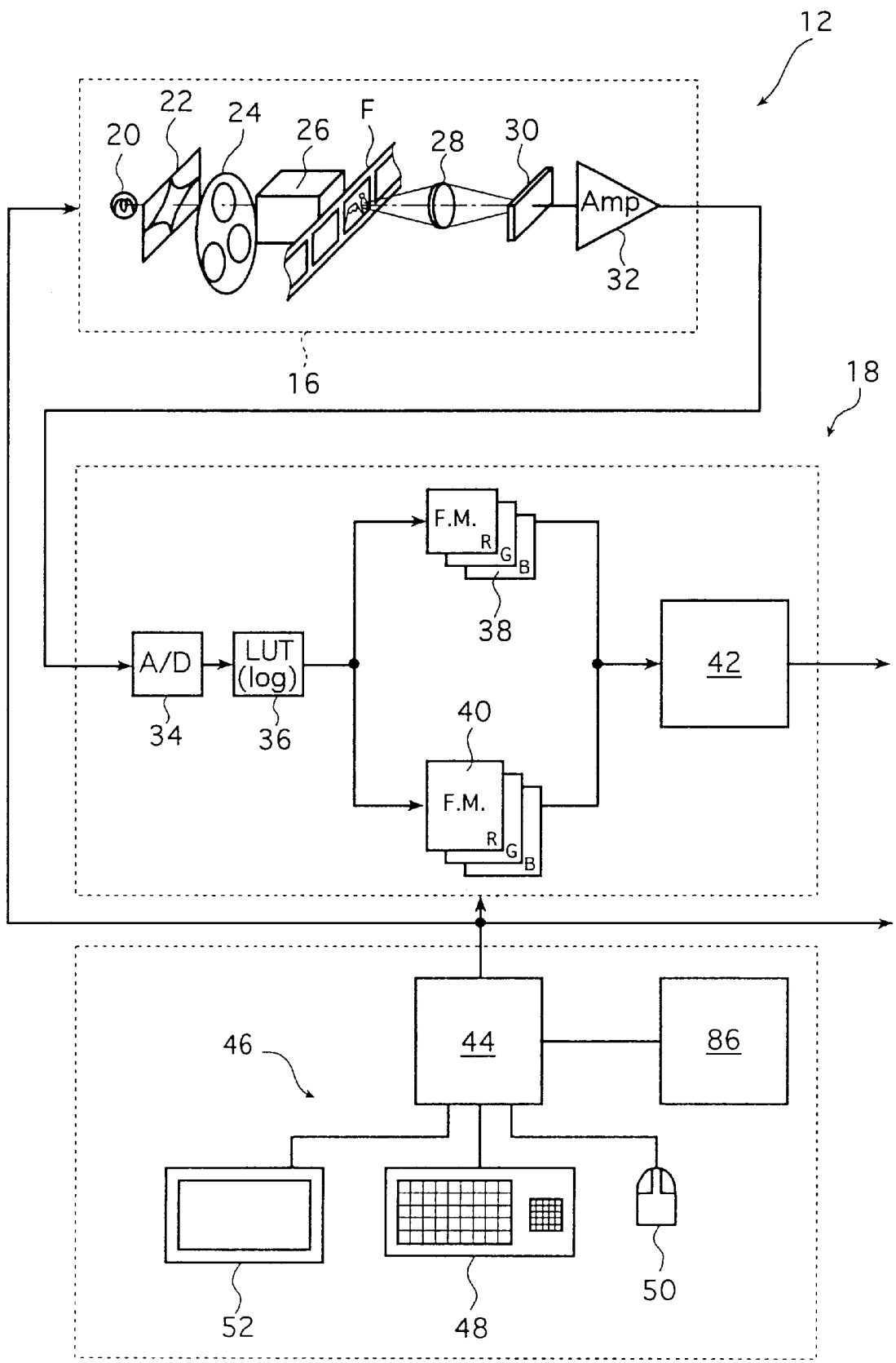
FIG. 2 is a diagram showing the concept of an exemplary input machine.

FIG. 2 is a schematic representation of an example of the input machine 12. In the illustrated case, the scanner 16 reads the image recorded on a film F and comprises the following: a light source 20, a variable diaphragm 22, a color filter plate 24 with which the image recorded on the film F is separated into three primary colors R (red), G (green) and B (blue), a diffusion box 26, an imaging lens 28, a CCD sensor 30 of an area type that performs frame-by-frame reading of the image recorded on the film F, and an amplifier 32.

In the scanner 16, reading light issuing from the light source 20 has its quantity adjusted by the diaphragm 22, then passes through the color filter plate 24 for color adjustment and it is subsequently diffused uniformly across the surface of the film F by means of the diffusion box 26 so that it is incident on the film F. Passage through the film F produces projected light which carries the image recorded on the film F; by means of the imaging lens 28, the projected light is focused on the image-receiving plane of the CCD sensor 30 which then performs photoelectric reading of relevant image data.

The image data read by the CCD sensor 30 is amplified by the amplifier 32 and input into the controller 18 as analog image data corresponding to the image recorded on the film F.

In the scanner 16, the color filters R, G and B of the color filter plate 24 are inserted in succession to perform a total of three cycles of the above-described image reading operation, whereby the image recorded on the film F is read as a mixture of three separated primary colors R, G and B.

In the illustrated case, image reading for producing the output image data (which is hereunder referred to as "fine scanning") is preceded by prescanning which performs rough image reading at low resolution. On the basis of the image data obtained by this prescanning, the conditions for various kinds of image processing are set and in accordance with the thus set conditions, the fine scanned image data is subjected to image processing to produce output image data for image recording by the printer 14. Prescanning and fine scanning are essentially the same except for the resolution of image reading.

The subsequent stage of the input machine 12 is the controller 18 which, in the illustrated case, comprises an A/D (analog-digital) converter 34, a LUT (lookup table) 36, a prescanning frame memory (hereunder "prescanning memory") 38, a fine scanning frame memory (hereunder "fine scanning memory") 40, an image processor 42, a control unit 44, an input/output unit 46 and a network connection 86.

The control unit 44 is typically a personal computer which performs the overall control and management of the photoprinter 10 via the input/output unit 46.

The input/output unit 46 comprises essentially a keyboard 48 and a mouse 50 which are manipulated to enter (set) various conditions, as well as to enter menu selection and commands for tasks to be performed and commands for various kinds of image processing such as color/density correction, and a display 52 for providing a graphic representation of the image read with the scanner 16, commands for performing various manipulations, images showing the settings/registrations of various conditions, and so forth.

The network connection 86 is for connecting the control unit 44 to various networks such as wide area networks (WAN) and local area networks (LAN) typified by Ethernet and it has, for example, an Ethernet card for connecting the control unit 44 to a LAN, a modem for connecting it to a WAN via a communications channel, and software for connection to networks.

Figure 3A:
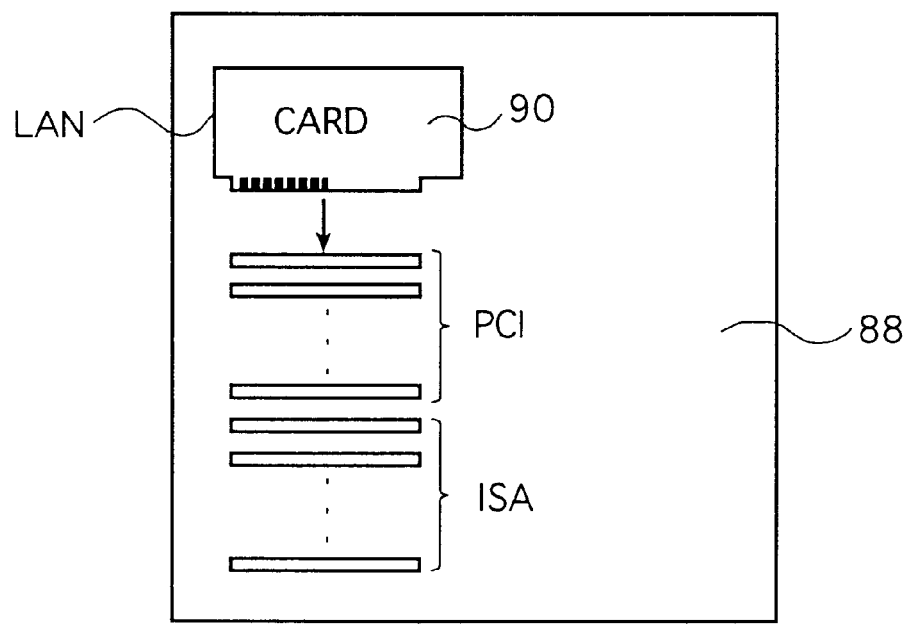
FIG. 3A is a conceptual diagram showing the top panel of an exemplary network connection.
Figure 3B:
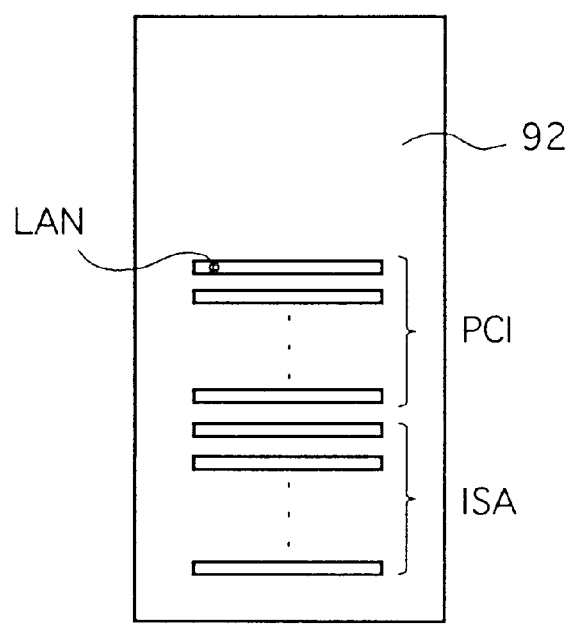
FIG. 3B is a conceptual diagram showing the back panel of the network connection.

FIGS. 3A and 3B are two diagrams showing the concept of an example of the network connection 86. FIG. 3A shows the concept of the top panel of the motherboard 88 of a personal computer as a typical example of the control unit 44. As shown, the motherboard 88 is furnished with a plurality of expansion slots for increasing the capabilities of the personal computer such as PCI (peripheral component interconnect) buses and ISA (industry standard architecture) buses.

Referring to FIG. 3A, an Ethernet card 90 is an example of the network connection 86 and serves as a function expansion card for increasing the capabilities of the personal computer. A PCI bus-compatible Ethernet card may be used upon being plugged into one of the PCI bus expansion slots. It should be noted that various other function expansion cards such as an SCSI (small computer system interface) card may be plugged into expansion slots.

FIG. 3B shows the concept of the back panel of the personal computer which is a typical example of the control unit 44. As shown, the connector portion of a function expansion card such as the Ethernet card 90 which is plugged into one of the expansion slots in the motherboard 88 shown in FIG. 3A is exposed on the back panel of the personal computer 92. Hence, the provision of the Ethernet card 90 allows the personal computer 92 (control unit 44) to be connected to a LAN via a dedicated cable.

As already mentioned, a modem is another example of the network connection 86 and its use permits the personal computer (control unit 44) to be connected to a WAN via a communications channel. Thus, the image reproducing apparatus of the invention which has the network connection 86 in the control unit 44 of the controller 18 offers the advantage that the photoprinter 10 can be connected to LAN, WAN and various other networks and used as one of the input/output devices on the networks.

The R, G and B analog image data read by means of the scanner 16 are converted to a digital form by the A/D converter 34 and then subjected to logarithmic conversion by the LUT 36 to produce density data. In the illustrated case, the resulting density data are stored in the prescanning memory 38 and the fine scanning memory 40 in response to the prescanning and the fine scanning, respectively, by means of the scanner 16 and in association with the image for each of the primary colors R, G and B.

As the image data are stored in the prescanning memory 38, the image processor 42 reads said image data out of the prescanning memory 38 and sets the conditions for various kinds of image processing including color/gradation correction, electronic magnifying, dynamic range compression/extension and sharpness enhancement. A prescanned image obtained by image processing in accordance with the thus set conditions is shown on the display 52 and verified by the operator as required to effect color/density, gradation and other adjustments, thereby determining the final conditions for image processing.

When the final conditions for image processing are thusly determined, the image processor 42 reads the fine scanned image data from the fine scanning memory 40 and, in accordance with the previously determined final conditions for image processing, the color/gradation of the image are first corrected; then, the image is enlarged/reduced (electronically magnified) in accordance with a specified electronic magnification, followed by the compression/extension of the dynamic range of the image data and various kinds of image processing such as sharpness enhancement so as to produce output image data.

Having described the configuration of the input machine 12, we now describe the printer 14. In the printer, a photosensitive material A is scanned and exposed to produce a latent image by light beams modulated in accordance with the image data output from the image processor 42 in the controller 18; the photosensitive material on which the latent image is formed is developed, subjected to other necessary processing, dried, cut to finished prints and sorted as required. As FIG. 1 shows, the printer 14 comprises essentially an exposing unit 54, a developing unit 56, a drying unit 58 and an ejecting unit 60.

Figure 4:
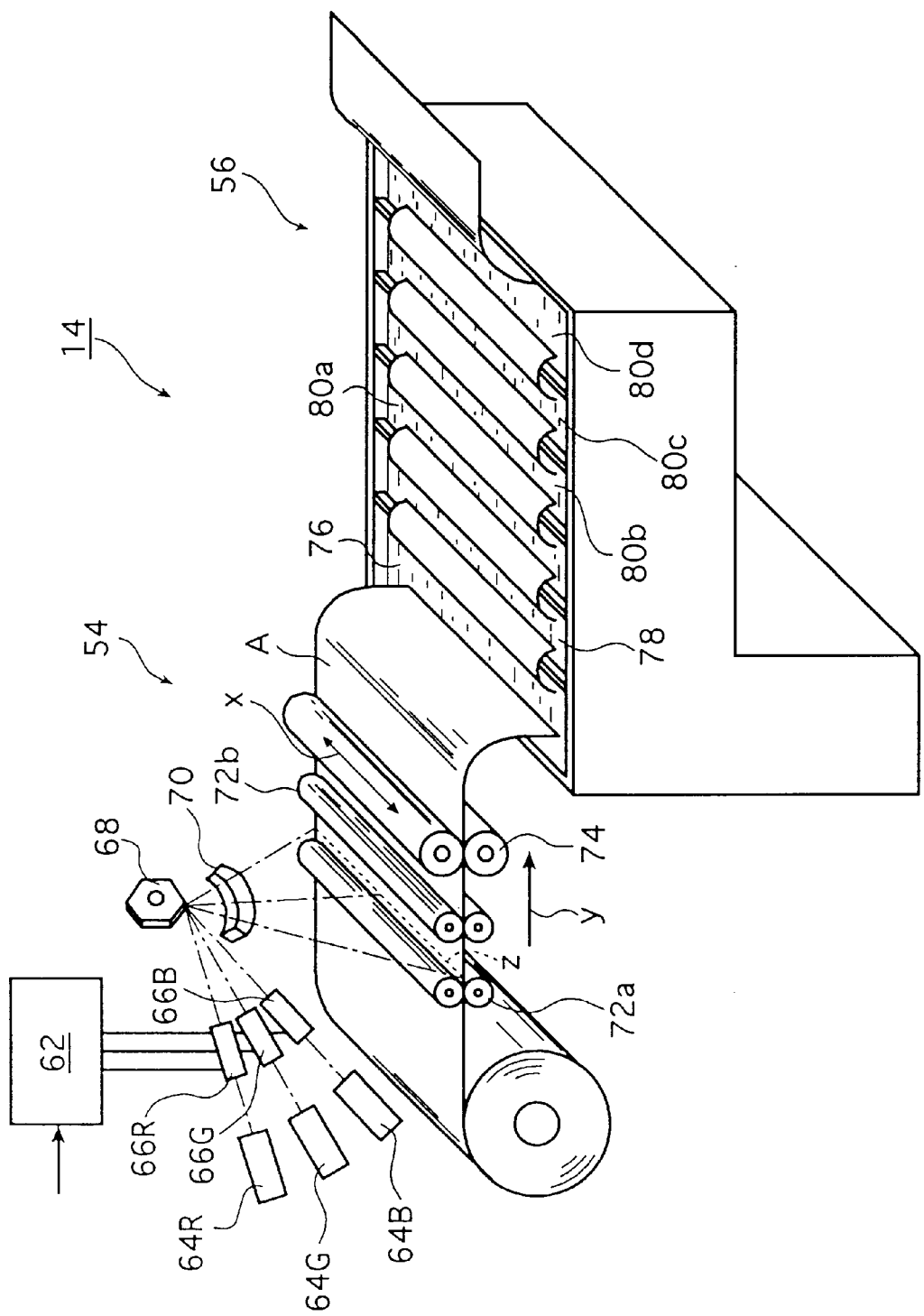
FIG. 4 is a partial conceptual diagram of an exemplary printer.

FIG. 4 is a partial schematic representation of an example of the printer 14. In the illustrated case, only the exposing unit 54 and the developing unit 56 of the printer 14 shown in FIG. 1 are illustrated and the image data output from the image processor 42 is transferred to a driver 62. The driver 62 converts digital image data to an analog form and drives acoustooptical modulators (AOM) 66R, 66G and 66B in the exposing unit 54 such that light beams are modulated in accordance with the resulting analog image data.

In the exposing unit 54, the photosensitive material A is scanned and exposed with the modulated light beams such that the image associated with the aforementioned image data is recorded on the photosensitive material A; to perform this function, the exposing unit 54 comprises essentially light sources 64R, 64G and 64B which issue light beams to expose R, G and B sensitive layers, respectively, of the light-sensitive material A, AOMs 66R, 66G and 66B which modulate the respective light beams from light sources 64R, 64G and 64B in accordance with the image to be recorded, a polygonal mirror 68 as an optical modulator, and fθ lens 70 and a means of transporting the photosensitive material A in an auxiliary scanning direction.

The light beams from the sources 64R, 64G and 64B travel at different angles to be launched into the corresponding AOMs 66R, 66G and 66B, are modulated by the driver 62 in accordance with the image to be recorded and thereafter incident at substantially the same point on the polygonal mirror 68, from which the beams are reflected for deflection in the main scanning direction (indicated by arrow x in FIG. 4) and adjusted by the fθ lens 70 such that they are imaged to give a specified beam shape in a specified scan position z to be incident on the photosensitive material A.

The photosensitive material A is elongated. By means of a pair of transport rollers 72a and 72b which are provided on opposite sides of the scan position z to constitute the means of transport in the auxiliary scanning direction (as indicated by arrow y) which is substantially perpendicular to the main scanning direction, the photosensitive material A is transported in the auxiliary scanning direction as the scan position z is held constant relative to the photosensitive material A. Since the light beams are deflected in the main scanning direction, the entire surface of the photosensitive material A being transported in the auxiliary scanning direction is scanned and exposed two-dimensionally with the deflected light beams, whereby the (latent) image of the video data transferred from the image processor 42 is recorded on the photosensitive material A.

After the end of exposure, the photosensitive material A is fed by means of a transport roller pair 74 into the developing unit 56, where it is subjected to development and other processing. If the photosensitive material A is a silver salt photosensitive material, the developing unit 56 is essentially composed of a color developing tank 76, a bleach-fixing tank 78, and rinsing tanks 80a, 80b, 80c, 80d. After being developed and given the necessary treatments in the respective tanks, the photosensitive material A is dried in the drying unit 58.

Subsequently, the dried photosensitive material A is sent to the ejecting unit 60 having a cutting device 82 and a sorter 84. The photosensitive material A is first cut by the cutting device 82 into individual finished prints in accordance with frame information. Thereafter, the prints are sorted by the sorter 84 to be placed in stacks in the order that is determined by relevant sort information.

We next describe the operation of the photoprinter 10 in a more specific way. When a command is entered to start print preparation, the scanner 16 first starts prescanning and the image on the film F is read at low resolution in a specified order such as R, G and B. The analog data read by the scanner 16 and fed into the image processor 42 is converted to a digital form by means of the A/D converter 34, then subjected to logarithmic conversion in the LUT 36 to produce density data, which are sequentially stored in the prescanning memory 38.

At the point of time when the scanner 16 has ended prescanning, whereby the prescanned image data has been taken into the prescanning memory 38, the image processor 42 reads said prescanned image data from the prescanning memory 38, sets the necessary conditions for image processing and causes the prescanned image to appear on the display 52.

At this stage, the operator may optionally perform verification to effect color/density, gradation and other adjustments by manipulation of the input/output unit 46, thereby determining the final conditions for image processing.

Subsequent to prescanning, the scanner 16 starts fine scanning, in which the image on the film F is read at high resolution in the same order of R, G and B as in prescanning and the resulting image data are stored in the fine scanning memory 40.

When the final conditions for image processing are determined and if the operator enters a command for output, the fine scanned image data 92 in the fine scanning memory 40 are read by means of the image processor 42, subjected to gradation correction and various other kinds of image processing, and output to the printer 14 as output image data.

In the printer 14, AOMs 66R, 66G and 66B are driven in accordance with the image data transferred from the image processor 42, and the light beams modulated in accordance with the image data and deflected in the main scanning direction perform scan exposure to form a latent image. The exposed photosensitive material A then enters the developing unit 56, where it is sequentially subjected to color development, bleach-fixing and rinse; thereafter, the developed photosensitive material A is dried in the drying unit 58, cut into discrete prints in the ejecting unit 60 and placed in position after sorting with the sorter 84.

Let us now describe an image reproducing system (printing system) which uses the image reproducing apparatus of the invention.

Figure 5:
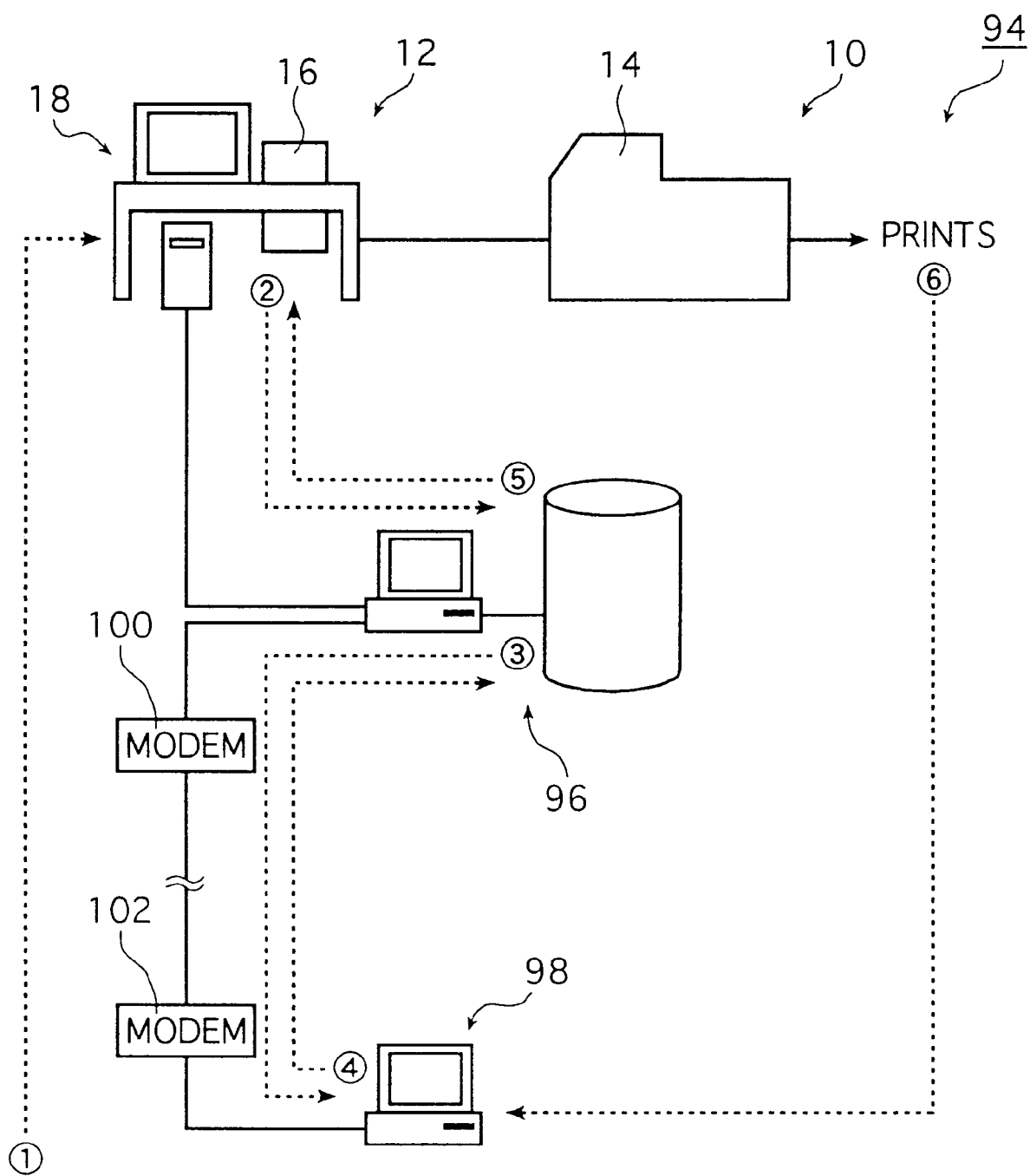
FIG. 5 is a conceptual diagram showing an exemplary image reproducing system incorporating the image reproducing apparatus of the invention.

FIG. 5 is a conceptual diagram showing an exemplary image reproducing system incorporating the image reproducing apparatus of the invention. The image reproducing system generally indicated by 94 in FIG. 5 has the above-described photoprinter 10 connected to networks and transfers image data (or video data) via the networks such that the user himself can directly perform the desired image processing on image data and use the latter to have prints output from the photoprinter 10 on the networks in a sequential and automatic manner. Having this operating feature, the image reproducing system 94 includes not only the photoprinter 10 but also an image server (or a video server) 96, a user terminal 98, and so forth.

As already mentioned hereinabove, the photoprinter 10 is an example of the image reproducing apparatus of the invention and has essentially a means of connecting itself to LAN (Local Area Network), WAN (Wide Area Network) and various other networks. The image server 96 serves as a host computer for the image reproducing system 94 and typically holds image data for individual users. The user terminal 98 which is typically a personal computer has a capability for performing the desired image processing on the image data.

A LAN is established between the photoprinter 10 and the image server 96, which are interconnected by a dedicated cable for the LAN which is activated, typically by plugging in an Ethernet card (not shown). In contrast, a WAN is established between the image server 96 and the user terminal 98, which are interconnected by a communications channel for the WAN via modems 100 and 102.

On the pages that follow, the operation of the image reproducing system 94 of the invention is described by referring to the dashed lines labeled respective numbers ①–⑥.

First, as indicated by reference number ①, the user requests that the image recorded on an original such as an exposed negative film be registered in the image server 96. In response to the user request, the photoprinter 10 uses the scanner 16 to read the original image, converts the obtained image data to a digital form, sends the digital image data to the image server 96 via the LAN (see reference number ②) and registers it to the image server 96 in correspondence with the specific user.

Each user has his own user terminal 98, for example, at home. Using the ID number and the password which are assigned to his identity, each user exploits his own modem 102 to connect his private terminal 98 to the image server 96 via the communications channel for the WAN and downloads his own image data from the image server 96 to his private terminal 98 (see reference number ③).

The user then performs the desired image processing on the downloaded image data using, for example, commercial photoretouching applications software which runs on the user terminal 98. Thereafter, as in downloading, the user connects his private terminal 98 to the image server 96 and uploads not only the image processed image data but also order information such as the print size and print volume from his private terminal 98 to the image server 96 (see reference number ④)

Thus, the image reproducing system 94 of the invention enables the user to perform the desired image processing on the image data read from the image recorded on the original, thereby producing prints which are finished to the preference of the user. In addition, the user can order only the desired prints after verifying the image data registered in the image server 96 and this eliminates the possibility of outputting unwanted prints.

If the user has his own scanner, he may himself read the original image, convert it to a digital form, performs the desired image processing on the digital image data at his private terminal 98 and thereafter upload the processed image data to the image server 96 together with specific order information.

At the image server 96, the order information uploaded by users is monitored at all times and, as indicated by reference number ⑤, the image data from different users are automatically transferred to the photoprinter 10 via the LAN in accordance with the relevant order information and the prints corresponding to the transferred image data are output from the photoprinter 10. The printouts are mailed, parceled or otherwise delivered to the respective users (see reference number ⑥) and the transactions are settled at a later time by automatically transferring the credits from the users' bank accounts to the service provider's account.

While the image reproducing apparatus of the invention has been described above in detail, it should be noted that the invention is in no way limited to the foregoing embodiment and various improvements and modifications can of course be made without departing from the spirit and scope of the invention.

As described above in detail, the image reproducing apparatus of the invention has the means of connecting itself to networks and the image reproducing system of the invention enables this apparatus to be used as one of the input/output devices on the networks. Stated more specifically, the image reproducing apparatus of the invention can of course be operated as stand-alone equipment such that it reads the image recorded on an original, performs specified tasks of image processing and outputs prints that have the image processed image data reproduced thereon; in addition, the apparatus can be operated in such an environment that it is connected to networks to realize a system like the image reproducing system of the invention.

Thus, using the image reproducing apparatus of the invention which is incorporated in an image reproducing system as claimed by the invention, the user can perform the desired image processing on image data, transfer the processed data to the image reproducing apparatus via the networks and have printouts in which the processed image data have been reproduced. As a result, the present invention enables prints to be finished to the preference of specific users.

What is claimed is:

1. A system for printing photographic images provided by a user and adjusted for particular user image processing preferences comprising:
   a scanner scanning images for printing into said system;
   processing circuitry for digitizing said scanned images to develop digitized image data and for processing said digitized image data in accordance with preprogrammed preferences to produce corrected image data;
   a printer printing said corrected image data to produce photographic prints;
   a control device located at a first location for controlling said processing circuitry;
   a memory storing said corrected image data of the photographic images formed by said processing circuitry in association with a user ID and password;
   said control device including a communication system connected to a communication channel and allowing remote connection to the system for printing;
   a local user system located remotely from said first location and communicating with said control device via the communication system of the control device to access the corrected image data after introduction of the user ID and password, said local user system including user controllable processing circuitry to process said corrected image data based on user preferences to form user corrected image data;
   said local user system and said communication system of said control device communicating to upload said user corrected image data back to said control device to store it in said memory;
   said printer accessing said user corrected image data and using it to produce photographic prints in accordance with the user preferences.

2. The system of claim 1 wherein said local user controls said communication system from said local user system.

3. The system of claim 1 wherein said local user also communicates order information to said control device via said communication system, said control device controlling said printer to print the desired order.

4. The system of claim 1 wherein said user preferences are particular prerecorded user preferences stored at the local user system.

5. A method for printing photographic images provided by a user and adjusted for particular user image processing preferences comprising the steps of:
   a) scanning images for printing to produce an electronic representation thereof;
   b) digitizing said scanned images to develop digitized image data;
   c) processing said digitized image data in accordance with preprogrammed preferences to produce corrected image data;
   d) storing said corrected image data of the photographic images formed by said processing circuitry in association with a user ID and password; and
   e) printing said corrected image data to produce photographic prints;
   said steps a) to e) being performed at a printing location by a printing device including a communication system facilitating communication between said printing device and a user local system physically remote from said printing location;
   said method further comprising:
   f) communicating between the user local system and the printing device via the communication system;
   g) accessing the corrected image data stored by said step d) after introduction of the user ID and password from the user local system,
   h) processing said corrected image data with said local user system based on user preferences to form user corrected image data, and
   i) uploading said user corrected image data from said user local system back to said printing location to store it in said memory;
   said step e) of printing accessing said user corrected image data and using it to produce photographic prints in accordance with the user preferences.

6. The method of claim 5 wherein said steps f) and g) are performed by the local user by instructions introduced to said user local system.

7. The method of claim 5 wherein said local user also communicates order information to said printing location via said step f) of communicating, said step e) of printing the desired order for the user.

8. The method of claim 5 wherein said user preferences are particular prerecorded user preferences stored at the local user system.

9. A system for printing photographic images including individual user desirable image processing comprising:
   a scanner for scanning images for printing;
   a processing circuitry for digitizing said scanned images to generate digitized image data and for image processing said image data in accordance with preprogrammed preferences;
   a memory device for storing said image processed image data associated with a user ID and password which are unique for an individual user;

a printer for printing photographic prints corresponding to and based on said image processed image data stored in said memory device;

a control device at a control location for controlling operations of said scanner, said processing circuitry, said memory device and said printer and;

a local user system located at a remote location separate from said control location of said control device and processing said image data based on user preferences of the individual user;

said control device and said local user system individually including a communication system to establish remote connection therebetween over a communication channel;

wherein said local user system establishes the remote connection with said control device over said communication channel, downloads said image processed image data of said processing circuitry from said memory device by using said user ID and password which are unique for individual user, performs user desirable image processing on said image processed image data of said processing circuitry based on said user preferences, and uploads said image processed image data of said local user system back to said memory device over said communication channel;

said control device controlling said printer to print photographic prints corresponding to said image processed image data uploaded from said local user system to said memory device.

10. The system of claim 9, wherein said user controls said control device from said local user system over said communication channel.

11. The system of claim 9, wherein said user uploads order information for printing said user desirable photographic images to said control device over said communication channel.

12. The system of claim 9, wherein said user preferences are unique to an individual user, and which are pre-generated to store in the local user system.

13. A method for printing photographic images subjected to individual user desirable image processing, comprising the steps of:

a) scanning images for printing;

b) digitizing said scanned images to generate digitized image data;

c) image processing said image data in accordance with preprogrammed preferences associated with a user;

d) storing said image processed image data by using a user ID and password which are unique for an individual user in an individual local user system;

e) establishing the remote connection with said image reproducing system over a communication channel;

f) downloading said image processed image data from said image reproducing system by using said user ID and password which are unique for the individual user;

g) performing user desirable image processing on said image processed image data based on user preferences;

h) uploading said user desirable image processed image data back to said image reproducing system;

i) controlling the printing of photographic prints corresponding to said user desirable image processed image data uploaded from said local user system to said image reproducing system.

14. The method of claim 13, wherein said steps e), f), g) and h) are performed by the local user in accordance with instructions introduced from said local user system.

15. The method of claim 13, wherein said user uploads order information for printing said user desirable photographic images to said control device over said communication channel.

16. The method claim 13, wherein said user preferences are unique to individual user, and which are pre-generated to store in the local user system.

* * * * *